(12) United States Patent
Derventzis et al.

(10) Patent No.: US 6,665,460 B2
(45) Date of Patent: Dec. 16, 2003

(54) METHOD AND APPARATUS FOR SELECTING SIGNAL COMPONENTS FROM OPTICAL SIGNALS

(75) Inventors: Stylianos Derventzis, North York (CA); Steve Hill, Toronto (CA); Blaine Hobson, King City (CA); Ali Langari, Scarborough (CA); Mike Liwak, Pickering (CA); Robert B. Thayer, Painted Post, NY (US)

(73) Assignee: Photonami Inc., Richmond Hill (CA)

( * ) Notice: Subject to any disclaimer, the term of this patent is extended or adjusted under 35 U.S.C. 154(b) by 83 days.

(21) Appl. No.: 10/071,002

(22) Filed: Feb. 7, 2002

(65) Prior Publication Data

US 2002/0154660 A1 Oct. 24, 2002

(30) Foreign Application Priority Data

Mar. 12, 2001 (CA) .............................. 2340540

(51) Int. Cl.⁷ .................................. G02B 6/26
(52) U.S. Cl. .......................... 385/16; 398/42
(58) Field of Search ............... 385/16, 24, 37, 385/39; 398/42, 43, 45, 79

(56) References Cited

U.S. PATENT DOCUMENTS

| | | | | |
|---|---|---|---|---|
| 3,804,209 A | * | 4/1974 | Edison | 187/387 |
| 3,807,531 A | * | 4/1974 | Mandel | 187/380 |
| 3,828,892 A | * | 8/1974 | Winkler et al. | 187/380 |
| 3,851,735 A | * | 12/1974 | Winkler et al. | 187/380 |
| 3,854,554 A | * | 12/1974 | Booker, Jr. | 187/382 |
| 4,361,832 A | * | 11/1982 | Cole | 340/505 |
| 4,389,681 A | * | 6/1983 | Tanaka et al. | 360/27 |
| 5,305,320 A | * | 4/1994 | Andrews et al. | 370/229 |
| 6,181,334 B1 | * | 1/2001 | Freeman et al. | 725/138 |

* cited by examiner

Primary Examiner—Akm Enayet Ullah
(74) Attorney, Agent, or Firm—Hoffmann & Baron, LLP (57) ABSTRACT

A selector assembly to select and deselect signal components from optical signals is disclosed. The selector assembly has an input optical connector for optically connecting an input optical signal carrier to the selector assembly and an output optical connector for optically connecting the selector assembly to an output optical signal carrier. A signal demultiplexer is operatively positioned relative to the input optical connector so that optical signals passing into the selector assembly are demultiplexed by the demultiplexer into signal components, each signal component having a respective signal component beam path. A signal selector is provided in each of the signal component beam paths, each signal selector being switchable by the application of an electric field between at least a selecting state and a deselecting state such that each of the signal components may be either selected or deselected. A controller is coupled to the selector elements for turning on and off the electric field for switching the selectors. A signal multiplexer is operatively positioned between the signal selector and the output optical connector for multiplexing the selected signal components together after selection.

21 Claims, 6 Drawing Sheets

METHOD AND APPARATUS FOR SELECTING SIGNAL COMPONENTS FROM OPTICAL SIGNALS

FIELD OF THE INVENTION

This invention relates generally to the field of signal communication and more particularly, to communication systems using optical signals for transmitting optical-based information and for data communication. Most particularly, this invention relates to signal selection devices useful in the switching or routing of individual optical signal components of DWDM (Dense Wave Division Multiplexed) optical signals.

BACKGROUND OF THE INVENTION

Optical signals are now used extensively in signal communication systems to carry digital information. Through the use of DWDM, vast amounts of information can be densely packed onto optical signals, which makes the use of such signals highly desirable. DWDM provides a large number of individual wavelengths (at present, about 40 to 60 over each of the C and L bands) which can be simultaneously used to carry data in a single fibre as multiplexed signal components.

Currently, optical signal networks take the form of large rings or hubs, which are cross-connected to smaller local rings, which may in turn be connected to even smaller rings within a very localized area based on a SONET format. Each ring may be operated with specific protocols or framing patterns, data bit rates, compression, synchronisation and the like. At each connection between the various rings, the appropriate optical signals must be connected and directed or routed in the appropriate direction. These connections are currently made by optical-electrical-optical (OEO) switches, which require that the optical signal be converted to an electrical signal, routed, reconverted to an optical signal and then sent on its way. This is an expensive process, especially when there are many DWDM channels and represents a significant bottleneck in the connection and switching operation of optical signal based systems. With the increasing use of mesh network architectures, multiple node networks will require data to travel through multiple switches. In such cases, the use of OEO switches would constitute an even more significant bottleneck.

The use of DWDM allows a single fibre to carry multiple wavelengths which may also be referred as signal components. Typically, fibres will be bundled together to form large capacity information carrying systems. Multiple fibres and multiple signal components per fibre increase the need of routing capacity in the cross-connect. Inherent in such large capacity intersections is a need for enhanced routing capacity, which in turn, drives a need for quick and reliable signal selection for switching or routing purposes.

What is needed is a device that can dynamically and transparently route optical based information- or data-carrying signals according to the intended destination of the information, without the need to convert the signals into electrical signals. Switching signals to different destinations requires separating the signal components from the DWDM signals, selecting the appropriate signal components and switching the same. This may be referred to as dynamic switching which means establishing end to end optical signal paths without the need to manually reconfigure connections. Transparent switching means that the end to end path is established without the need to use OEO conversions.

Recent advances in this field are directed to devices such as, for example, MEMS switches and bubble reflecting arrays that permit the routing of signal components in an optical state. In both of these recent technologies the optical signal is first de-multiplexed into individual signal components. Then the individual signal components are transmitted along a waveguide before being launched into free space at a moveable reflector, either a mirror or a reflective bubble. The reflector can thus be moved to direct the signal component in one or another directions allowing the signal component to be directed to either a first or a second destination, thus permitting routing. However, this method of signal selection and subsequent direction is inherently slow because of the need to physically move the reflecting surfaces between the two positions. Typically the movement of the reflecting surfaces takes place in the order of many milliseconds.

The physical movement of a reflector, while permitting all optical routing, has a number of inherent problems, such as stiction and fatigue or wear of the moving elements over time. Such wear will also limit the number of switching cycles the device can reliably perform. Further, the redirection by means of moveable reflectors limits the geometry of the signal switching. Creating a divergence in the signal path restricts the architecture to a defined input signal plane and a defined output signal plane. Also, the signal component connection requirements must be known before the reflecting array is custom built and the whole device must be removed and replaced if more capacity is needed. Lastly, as the number of signal components being redirected increases, the number of reflecting surfaces required also increases and the overall size of the devices increases. With a larger sized device alignment problems become magnified. One limitation is the use of fibre waveguides to direct each signal component into the reflective array. To even connect the required number of fibres (one for each de-multiplexed signal component) requires a physically large device. What is desired is a means for selecting signal components that does not rely on the physical manipulation of an object such as a reflecting surface and which permits dynamic and transparent optical routing or switching of signal components.

SUMMARY OF THE INVENTION

Therefore, what is desired is a reliable selector for selecting signal components from multiplexed optical signals. The selector should operate transparently so the optical signals entering the selector need not be converted to an electrical signal. In this way, any bottlenecks created by OEO switching techniques can be avoided. Further, the selector should be able to respond quickly (i.e. preferably at least as fast as specific SONET restoration times and ideally even faster) and yet be relatively inexpensive to make. Any such selector should also be robust, and be able to reliably operate over time and after many selecting events. Most preferably the device should be capable of having wavelength selection capacity added without creating significant alignment problems. As well the device should be capable of working on signals passing through the device in either direction so as to not be restricted to defined input and output planes to improve flexibility and to reduce costs.

According to a first aspect of the present invention, there is provided a selector assembly to select and deselect signal components from optical signals, said selector assembly comprising:

an input optical connector for optically connecting an input optical signal carrier to said selector assembly;

an output optical connector for optically connecting said selector assembly to an output optical signal carrier;

a signal demultiplexer operatively positioned relative to said input optical connector so that optical signals passing into said selector assembly are demultiplexed by said demultiplexer into signal components, each signal component having a respective signal component beam path;

a signal selector located in each of said signal component beam paths, each of said signal selectors being switchable by the application of an electric field between at least a selecting state and a deselecting state such that each of said signal components may be either selected or deselected;

a controller coupled to said selector element for creating the electric field for switching said selectors; and a signal multiplexer operatively positioned between said signal selector and said output optical connector for multiplexing said selected signal components together after selection.

According to a second aspect of the present invention, there is provided a method of selecting signal components from optical signals, said method comprising the steps of:

(a) introducing a DWDM optical signal into a selector assembly;

(b) demultiplexing said optical signal into a plurality of signal components;

(c) directing each signal component along a signal component beam path incident to a electro optic selector element;

(d) electronically controlling said electroptic selector element to either select or deselect signal components, and (e) multiplexing said selected signal components together.

According to another aspect of the present invention, there is provided a signal selector assembly for selecting and deselecting optical signal components from optical signals, said signal selector assembly comprising:

a pair of signal demultiplexer/multiplexers, one located on either side of said signal selector assembly for demultiplexing signals passing into the signal selector assembly and for multiplexing selected signals passing out of the signal selector assembly; and a signal component selector located between the signal demultiplexer/multiplexers, said signal component selector permitting each optical signal component to pass through in an east only direction, in a west direction only, in both east and west directions simultaneously or in neither direction, wherein said signal selector assembly provides bi-directional signal component selection.

BRIEF DESCRIPTION OF THE DRAWINGS

Reference will now be made, by way of example only, to figures which depict preferred embodiments of the present invention and in which.

DETAILED DESCRIPTION OF THE PREFERRED EMBODIMENTS

Figure 1:
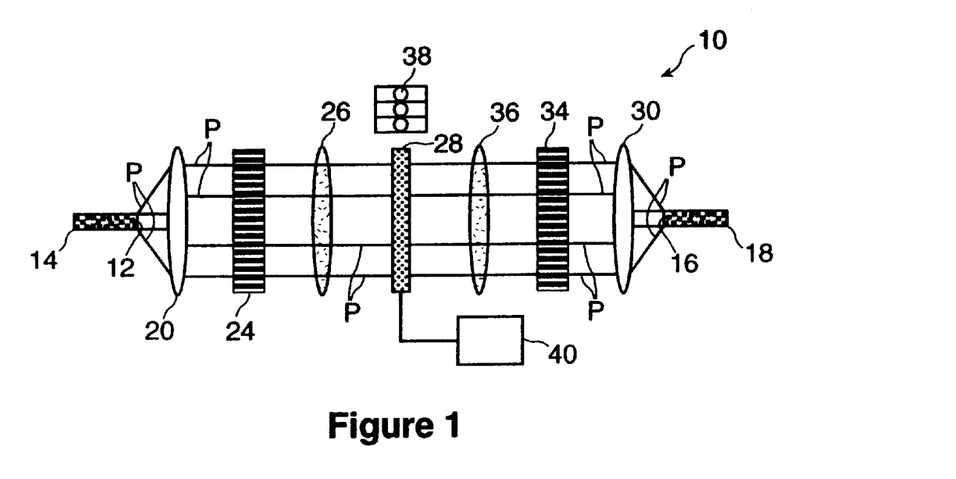
FIG. 1 is a schematic diagram of the selector assembly according to the present invention.

Referring to FIG. 1, a first embodiment of a selector assembly to select and deselect signal components from optical signals is shown, and is generally designated by the reference numeral 10. In this sense "signal component" means one wavelength or a discrete wavelength band capable of carrying at least one channel of optically encoded information. Optical signal means a multiplexed signal comprised of multiple signal components. "Select" means that enough of a signal or signal component is present after selection to permit further signal manipulation. "Deselect" means enough of the optical signal or signal component is blocked, scattered, polarized, reflected, absorbed or otherwise affected to prevent further practical manipulation of the optical signal or signal component after deselection has occurred. "Electro optical" means a device in which the optical properties can be changed by the application of an electrical signal, and is to be distinguished from electro mechanical in which an electrical field creates mechanical movement and thermo optical, in which an electrical field creates heat which in turn creates a change in optical properties. "Operatively positioned" in this context means that one element is positioned relative to one or more other elements to permit a desired function to occur. "Beam path" means a path along which an optical signal may travel, either guided or unguided.

The selector assembly 10 includes an end 12 for optically connecting the selector assembly 10 to the first optical signal carrier 14. The end 12 may be the cut edge of a wave guide, which is suitably polished or may be some other form of signal source emitter. What is comprehended by the present invention is that the signal source will provide a DWDM signal that can be operatively coupled to the remaining elements of the present invention by means of an optical connection. The first optical signal carrier 14 carries a first optical signal to the selector assembly 10. The selector assembly 10 also includes a second end 16 for optically connecting the selector assembly 10 to a second optical signal carrier 18. The second optical signal carrier 18 may also carry a second optical signal towards the selector assembly 10, and carries any selected first signal components from the first optical signal away from the selector assembly 10 as explained in more detail below. First and second optical signal carriers can be any form of optical signal carrier and most usually will be fibre optic wave guides.

As shown in FIG. 1, according to the first embodiment the selector assembly 10 further comprises a first collimator 20, a first demultiplexer 24 and a first focussor 26. The selector assembly 10 further comprises a selector array 28, a second collimator 30, a second demultiplexer 34 and a second focussor 36.

In operation, the first optical signal enters the selector assembly 10 through the end 12. As the first optical signal enters into the selector assembly 10, it will exit from the end 12 of the wave guide and be substantially unguided in which case it follows a portion of beam path p which diverges from the source emitter (in this case the exit from the wave guide). The first collimator 20 is operatively positioned relative to the end 12 so as to generally collimate the first optical signal as it passes through the first collimator 12. The first collimator 20 preferably comprises one or more lenses to collimate the first optical signal.

Those skilled in the art will appreciate that the positioning of the first collimator 20 depends in part upon the angular spread of the first optical signal as it exits the end 12 into the selector assembly 10. Generally, the angular spread of an optical signal leaving a fibre depends on the parameters of the fibre, specifically, the "numerical aperture" of the fibre. For example, with a fibre having a numerical aperture of 0.2, the angular spread of a signal exiting such a fibre will be approximately 230°. It will further be appreciated by those skilled in the art that the first collimator 20 will preferably be operatively positioned to ensure that, given the angular spread of the beam path of the first optical signal, none of the first optical signal is lost and all of the first optical signal passes through the collimator 20.

The first collimator 20 is inherently bi-directional. In other words, an optical signal having a diverging beam path exiting the end 12 and passing through the first collimator 20 will be transformed into an optical signal with a parallel beam path. An optical signal having a parallel beam path moving through the first collimator 20 in the opposite direction will be transformed into an optical signal having a converging beam path, with the cone of convergence contained within the cone of acceptance of the fibre or end 12. The second collimator 30 operates in a similar inherently bi-directional fashion.

The first demultiplexer 24 is operatively positioned relative to the first collimator 20 so that the first optical signal, having passed through the first collimator 20, enters and passes through the first demultiplexer 24. The purpose of the first demultiplexer 24 is to demultiplex the first optical signal into a plurality of first signal components. With a diffraction demultiplexer this occurs because different wavelengths of light diffract at different angles. Prior to passing through the first demultiplexer 24, the first optical signal is a composite polychromatic signal made up of one or more first signal wavelength components. When the first optical signal travels through the first demultiplexer 24, it is, for example, diffracted into separated bands of light, each centred on a different wavelength, each of which comprises a different first signal wavelength component. The demultiplexer 24 is also inherently a bi-directional device, demultiplexing in one direction while multiplexing in the other direction.

It will further be appreciated that the present invention comprehends that the demultiplexing function can be performed by any device that has the effect of dividing an incident optical signal into its wavelength components. Thus, for example for free space, the preferred form of the demultiplexer 24 is a diffraction grating, but a holographic grating or a replicated ruled grating is also comprehended. An AWG (Arrayed Wave Guide) could also be used with a suitable optical connection to the end 12. An AWG has the advantage of eliminating the need for lenses at either end. Also, a prism could be used as the demultiplexer 24. Although all such devices separate the multiplexed signal into individual signal components and thus can be used, good results have been achieved with a diffraction grating demultiplexer 24 as noted above.

Typically, a diffraction grating demultiplexer would create two or more diffractive orders i.e. two or more bands of light for each wavelength. It will be appreciated that the signal components are easier to further manipulate if substantially all of the power in each wavelength signal component is contained in one band or wavelength of light. Therefore, the demultiplexer 24 will preferably be a blazed diffraction grating. Blazing the diffraction grating has the effect of concentrating substantially all of the optical power of the signal components in a single diffracted order. The blazed diffraction grating thus results in lower power attenuation than a regular diffraction grating and is preferred.

Like the first collimator 20, the first demultiplexer 24 is inherently bi-directional in that it too operates in reverse. Thus, polychromatic light entering from the direction of the end 12 is split into its wavelength signal components. In reverse, individual wavelength signal component bands entering the demultiplexer 24 from its opposite side are multiplexed together into polychromatic light. The second demultiplexer 34 operates in the same inherently bi-directional fashion.

The first focussor 26 is operatively positioned relative to the first demultiplexer 24 so that the wavelength-differentiated bands of light (representing the various first signal components of the first optical signal) are incident upon the first focussor 26. Most preferably the focussor of the present invention is in the form of one or more focussing lenses which direct the various first signal components onto specific locations on the selector array 28, as will be described further below. The signal components may be individually focussed, or they may be simply directed onto the selector 28 array in the form of a substantially collimated beam. The first focussor 26 (and similarly, the second focussor 36) operate bidirectionally but in reverse for signal components travelling in an opposite direction.

Figure 2A:
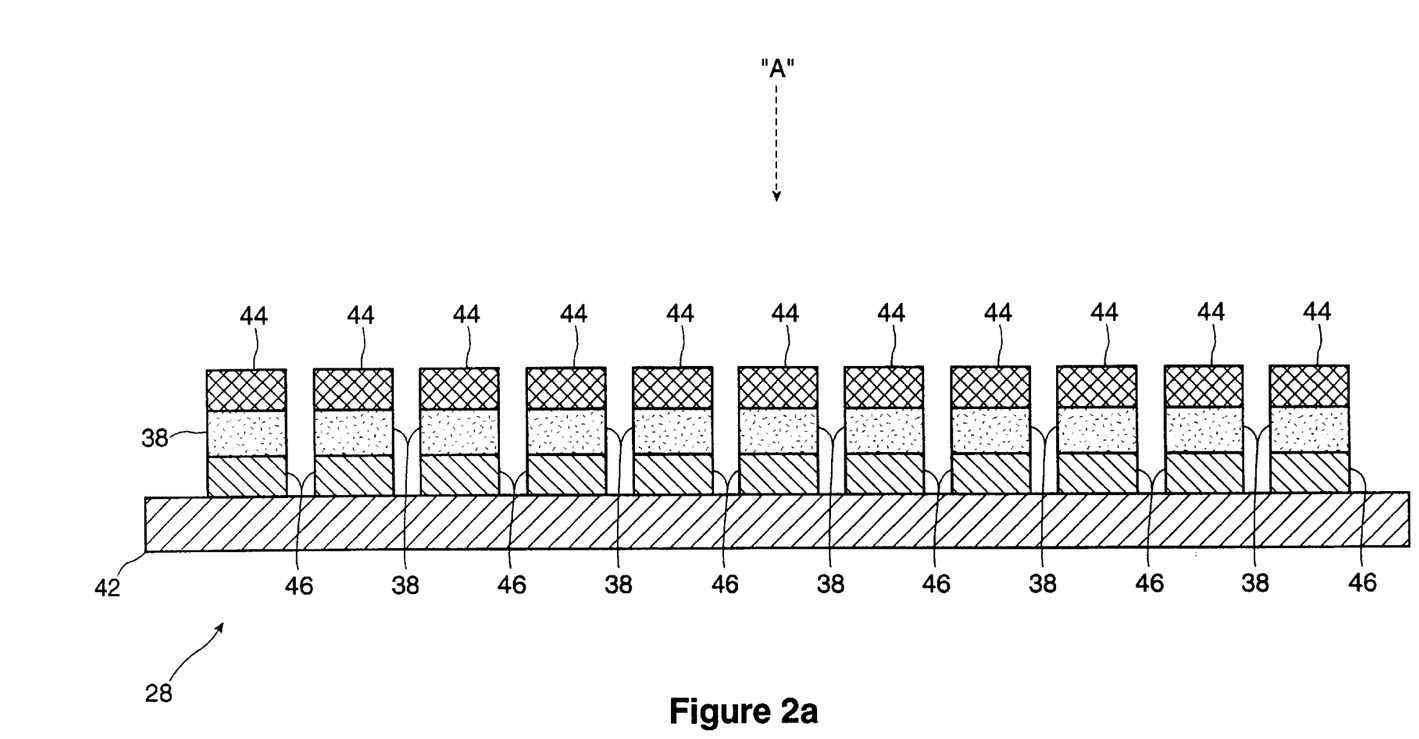
FIGS. 2A and 2B are side and front views respectively of the a selector array form the selector assembly of FIG. 1 according to the present invention.
Figure 2B:
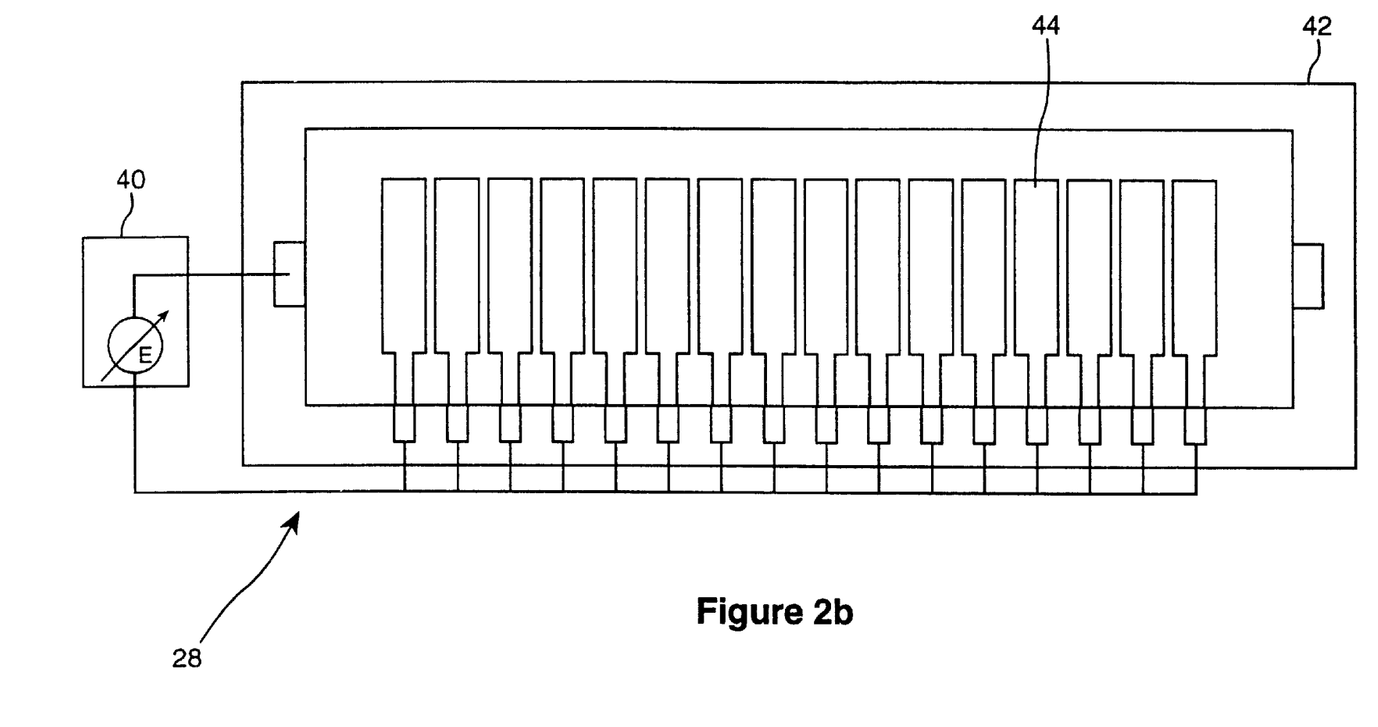

The selector array 28 is located at the centre of the assembly for the embodiment as drawn in FIG. 1 and is made up of a plurality of individual selectors elements 38 (shown in greater detail in FIGS. 2A and 2B). The function of the individual selectors 38 is to either select (i.e. pass) or deselect (i.e. block, scatter or the like) signal components in accordance with the routing requirements of the switch in which the selector assembly 10 is being employed. As each first signal component passes through the first focussor 26, the band of light is focussed or collimated onto a specific location, thus defining a narrow signal component beam path for each first signal component. The selector array 28 is operatively positioned relative to the first focussor 26 such that the selectors 38 are located one each in the signal component beam paths. As will be appreciated by those skilled in the art, the more narrow the signal component beam waist at the selector, the smaller and more efficient the selector elements can be. Each of the selectors 38 is switchable between at least a selecting state and deselecting state such that each first signal component may be selected or deselected.

Referring now generally to FIG. 2A, the selectors 38 preferably comprise an Electro-optic material such as PLZT (Polycrystalline Lanthanum modified Zirconate-Titanate). PLZT is a synthetic Electro-optic material that exhibits ferroelectric properties. Specifically, when a sufficiently large voltage and thus an electric field is applied across a section of PLZT, the crystalline structure of the PLZT is altered which in turn affects its optical properties. The application of a different voltage can be used to cause the PLZT to be returned to its original optic state. Depending upon the voltage applied, varying levels of change in optic properties can be achieved, so that a specific predetermined change in optical properties can be obtained with a specific electrical field being applied. The specific effect on the optical properties of the selector elements upon the application of various changes in electrical field is discussed in more detail below.

FIG. 2A is a side view of a preferred selector array 28, illustrating a scattering selection configuration. The selector array 28 includes a substrate 42, as well as a series of first electrodes 44, selectors 38 and second electrodes 46. Most preferably, the second electrodes 46 are applied as films to the substrate 42. It will be appreciated by those skilled in the art that the second electrodes 46 could be a single continuous electrode provided that no unacceptable cross talk arises. The selectors 38 are applied as films, preferably less than 1000 microns thick and most preferably about 1 micron of PLZT on the second electrodes 46, and the first electrodes 44 are applied as films to the selectors 38. As a result, each selector 38 has an electrode on opposite sides of it, permitting a voltage to be applied to the selector 38 across the thin film of PLZT. In the preferred embodiment, the first electrodes 44 and second electrodes 46 are coupled to a controller 40 (shown in FIGS. 1 and 2B), which allows the controller 40 to switch the selectors 38 by the application of an appropriate field as required.

Turning to FIG. 2B there is a plan view of the selector array 28 from the direction identified in FIG. 2A with the reference character "A". Selector elements 38 and second electrodes 46 are not shown in FIG. 2B, but are films having substantially the same shape as first electrodes 44, and are applied to the substrate 42. In the preferred embodiment, all of the first electrodes 44, the selectors 38, the second electrodes 46 and the substrate 42 are substantially transparent in the band of interest. In the preferred embodiment of the selector assembly 10 as shown in FIG. 1, the selector array 28 is positioned so that the first electrodes 44 are facing the end 12, and the substrate 42 faces the second end 16.

The selector assembly 10 further includes the controller 40, shown schematically coupled to the selector array 28, for switching the selectors 38. Preferably, the controller 40 will be some type of programmable electronic logic device, for example a microprocessor based system, allowing for fast switching of the selectors 38, and for the implementation of complex switching algorithms.

Thus the present invention comprehends that through the use of an applied electric field the Electro-optic material can have its optical properties altered in a way the permits the material to be used to select or deselect signal components as set out more fully below. While reference is made below to PLZT as a preferred material, it will be appreciated by those skilled in the art that other Electro optic materials can also be used. PLZT is preferred for its speed of response, inexpensive cost and ease of use.

The optical properties of the PLZT material are sensitive to material composition, as well as applied electrical field. Thus, different compositions of PLZT exhibit different Electro-optical properties. Good results have been achieved with a material which has the following material proportions where PLZT (x/y/z) is defined as $[(Pb_{(1-x)}La_x)(Zr_y Ti_2)_{1-x}O_3]$ with the preferred values about X=8–9; Y=65; Z=35 for a high speed selector array 28.

PLZT can be used in either of two manners according to the present invention. The first effect that is useful is the scattering of optical signals. In this effect the electrical field is applied coaxial with the signal beam. A change in the electrical field can cause the selector material to change between a transparent and a fully scattering condition. The second effect is where the electrical field is applied transverse to the optical signal beam. In this case the electrical field can cause the PLZT material to change a polarity of the optical signal. By changing the polarity selection and deselection can also be effected with appropriate pre and post selector element filtering. While changing the signal polarity is comprehended by the present invention the use of the scattering effect of the PLZT is most preferred.

The preferred method using the scattering effect of PLZT to deselect signal components incident upon a selector array 28 can now be understood. The PLZT can be made to have a rest or normal state that is either substantially transmissive to incident optical signals or substantially nontransmissive (corresponding to a normally open or a normally closed state). In the substantially transmissive state the optical signal components pass through the PLZT selector material without significant loss or attenuation. In the substantially nontransmissive state, the scattering effect of the PLZT is sufficient to prevent further signal manipulation on the other side of the selector array 28. Upon the application of a predetermined electrical field the PLZT crystals can be caused to change orientation, causing a switch between the transmissive and nontransmissive state.

Scattering selection is preferred because it permits the use of thin films of PLZT. As will be understood, the thinner the PLZT film is, the smaller the triggering electrical voltage needs to be to achieve the desired scattering and the more quickly the optical characteristics can be made to change between scattering and transmissive modes. As well, a thinner film of PLZT will cause less power loss to any optical signal that is permitted to pass through the thin film. Reduced power losses are desirable. Through the use of thin films of PLZT response times of about less than 200 believed achievable. This is much faster than the best results from the prior art micro-mechanical devices. Further, the use of static selector elements 38 means that the number of switch cycles prior to failure is very large for each selector element 38. It is estimated that the switch between transmissive to nontransmissive states can be made about $10^{12}$ times before switch fatigue will result in switch failure.

Figure 3A:
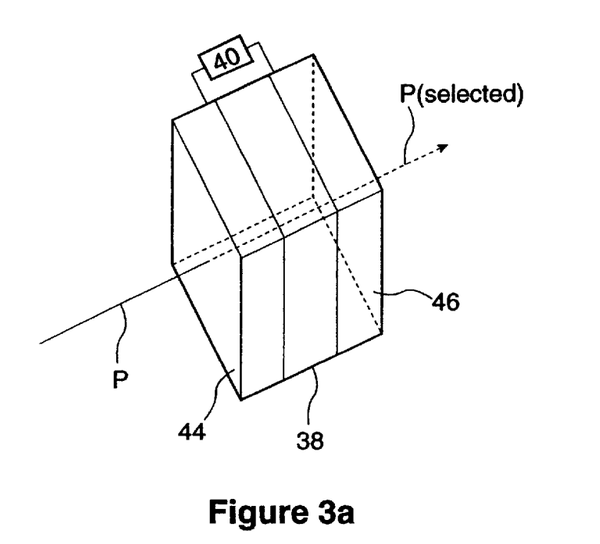
FIG. 3A illustrates one form of a selector element from the selector array of FIG. 2A according to the present invention.

A single selector element is shown schematically in FIG. 3A. Preferably, for the section by scattering mode of operation, both the first electrodes 44 and the second electrodes 46 are comprised of a transparent conductor through which the optical signal can pass. Reasonable results have been achieved by making the first electrodes 44 and second electrodes 46 from indium tin oxide (ITO) a transparent conductor that possesses these desired characteristics of transparency and electrical conductivity. Other transparent electrodes can also be used, provided that the are able to carry an appropriate field and are both transparent and responsive.

Figure 3B:
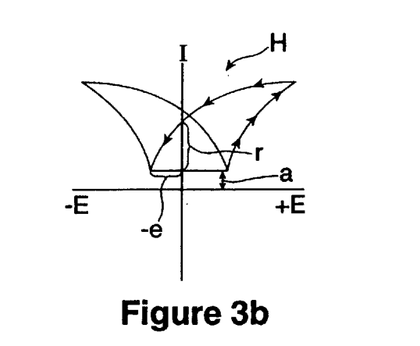
FIG. 3B illustrates a hysteresis effect in the application of an electrical signal the selector element of FIG. 3A.

One of the properties of PLZT is that there is a hysteresis loop associated with the change in optical properties. An exemplary loop for scattering mode operation is shown in FIG. 3B at H. In FIG. 3B the y axis is light intensity and the x axis is electrical field strength. It will be noted that the loop has a flat region located at distance a above the x axis. This represents that even in the full light scattering mode, some of the light passes through the selector. Thus, according to the present invention it is required to select a composition of PLZT where a is sufficiently small to permit de-selection of signal components.

As the loop H shows, increasing the electric field applied to the PLZT, creates the electro optic effect of making the material more light transmissive, in the sense that the light intensity of the transmitted light begins to rise. Removing the electric field does not reduce the change in optical properties to zero, but rather a remnant effect remains (shown as r) which needs to be removed with the application of a coercive or reversed electrical field (−e). Different compositions of PLZT exhibit different electro optic properties having differently shaped hysteresis curves. The present invention comprehends that any suitable composition can be used, provided that the controller 40 is configured to permit the material to quickly cycle around the hysteresis loop in a way to permit the rapid selection and deselection of optical signal components. Thus, for any given PLZT composition, the material will need to be tested, the hysteresis loop determined and the controller calibrated to deliver the electrical filed required to effect the desired change in optical properties.

Figure 4A:
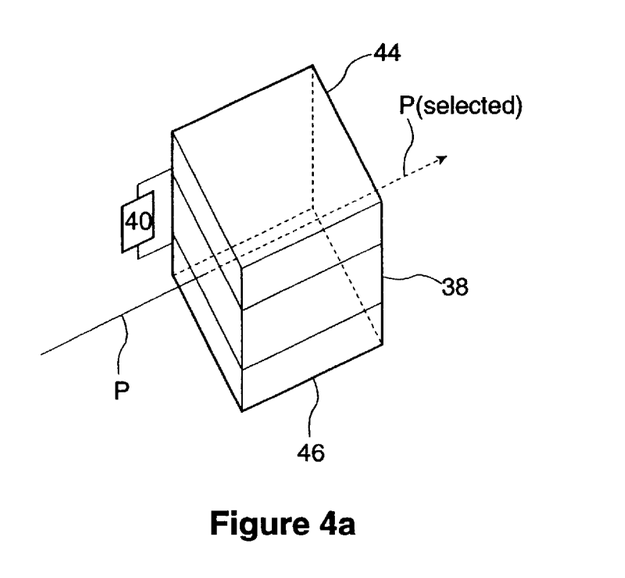
FIG. 4A illustrates another form of a selector element according to the present invention.

In FIG. 4A another orientation of electrodes is shown. In some circumstances, as noted above, polarity may be used as a means of selecting and deselecting signals. In such a case, although further elements might be required like polarity filters, to establish a polarity of the incoming signal in the first place, laterally placed electrodes can be used. In this sense laterally placed means that the optical signal is transverse to the electrical field being applied so that the optical signals pass through the electro-optic material but not through the electrodes.

Figure 4B:
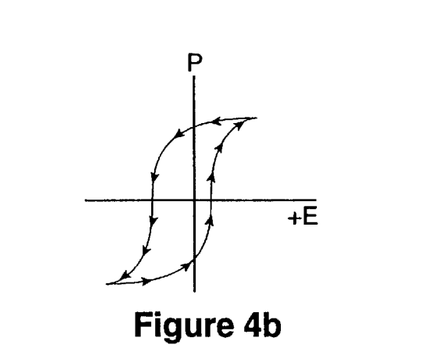
FIG. 4B illustrates a hysteresis effect in the application of an electrical signal the selector element of FIG. 4A.

In FIG. 4B a further hysteresis loop is shown that illustrates the effect on polarization of a change in applied electrical field. Thus, in FIG. 4B, the y axis represent polarity. Thus to change the polarity of the composition to the fullest extend possible requires cycling between a positive and a negative electric field as shown to overcome the hysteresis effect.

The operation of the selector assembly 10 can now be understood. The first optical signal enters into the selector assembly 10 from the first optical signal carrier 14 through the end 12. The first optical signal, which is diverging, passes through the first collimator 20, and is transformed into a signal having a generally collimated beam path. The first optical signal then enters the first demultiplexer 24. Prior to entering the first demultiplexer 24, the first optical signal is a composite signal composed of a number of first signal components of different wavelengths.

The first optical signal then passes through the first demultiplexer 24 and is demultiplexed into first signal components. Each first signal component comprises, at this stage, a band of light that carries digitally encoded information.

The first signal components then pass through the first focussor 26, which directs each of the first signal components along a respective signal component beam path. Thus, each first signal component is directed to a selector 28, which is individually switchable by virtue of the controller 40, between a selecting state and a deselecting state. Thus, the controller 40 can be used to choose which first signal components will pass through the selector (i.e. which ones will be selected) and which will be scattered (i.e. which will be deselected).

The selectors 38 shown in the embodiment of FIG. 1 preferably pass the signal components from one side of the selector and then out the other side. Thus, the first signal components which are selected are able to pass completely through the selector array 28 and continue toward the second focussor 36. This configuration minimizes power loss through the selector. However, if the power loss through the selector is low enough, because, for example, the film is thin enough, then the selector could be configured with a reflecting surface located behind the selector which will reflect the signal back out in the direction it came. This is discussed in more detail below in respect of FIG. 5.

The second focussor 36 is operatively positioned relative to the selector array 28, so that the selected first signal components reach the second focussor 36 and are transformed into bands of wavelength-differentiated light. The second demultiplexer 34 is operatively positioned relative to the second focussor 36, so that the first signal components travelling from the second focussor 36 pass through the second demultiplexer 34 and are transformed into polychromatic light (i.e. an optical signal composed of whichever first signal components were selected by the selectors 38). The selected first optical signals then pass through the second collimator 30. As described above, the second collimator 30 works in reverse, so that the selected first optical signal, which has a generally collimated beam path, is transformed into a signal having converging beam path within the cone of acceptance of the second end 16.

It will be appreciated by those skilled in the art that the controller 40 may cause the selectors 38 to select all of the first signal components, some of the first signal components, or none. The number and identity of the first signal components that are selected by the selectors 38 depends on the destination of the data being carried by each first signal component at any particular time and the architecture of the switch in which the selector assembly 10 is being used.

Because of the symmetrical nature of the selector assembly 10, the selector assembly 10 can simultaneously select and deselect second signal components from a second optical signal entering the signal 10 through the second end 16. The second collimator 30, the second demultiplexer 34 and the second focussor 36 operate on a second optical signal in the same fashion as the first collimator 20, the first demultiplexer 24 and the first focussor 26 operate on the first optical signal. The second optical signal is divided into second signal components by the second demultiplexer 34, and the second signal components are focussed by the second focussor 36, such that each second signal component is directed along a respective signal component beam path. Then, the second signal components which are selected by the selectors 38 pass through the first focussor 26, the first demultiplexer 24, and the first collimator 20, in the same manner as the selected first signal components pass through the second focussor 36, the second demultiplexer 34, and the second collimator 30.

Thus, it will be appreciated that the selector assembly 10 can simultaneously select and deselect signal components from the first optical signal entering the selector assembly 10 at one end, and select and deselect second signal components from a second optical signal entering the selector assembly 10 at its other end. Because they are counter propagating and have an optical power below a non-linear threshold, the first and second optical signals can travel through one another without either signal being degraded. This bi-directional feature is strongly preferred, as it greatly increases the flexibility of any switch in which the selector assembly 10 is employed. Furthermore, depending on the architecture of the switch in which the selector assembly 10 is employed, the bi-directional feature of the selector assembly 10 should allow for a reduction in the number of selectors 10 needed in any switch to accomplish the same results.

Figure 7:
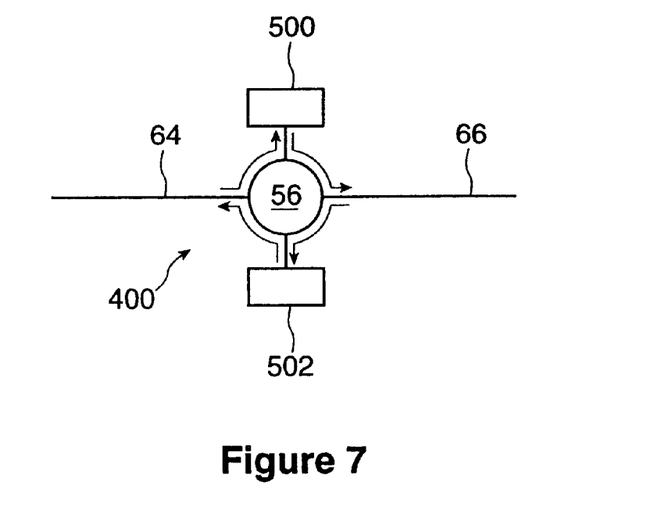
FIG. 7 is a schematic diagram of a further embodiment of the selector assembly according to the present invention.

As will be appreciated by those skilled in the art, if the first optical signal and the second optical signal pass through the selector simultaneously, then the selector element will only be able to permit signal components of the same wavelength to both pass in opposite directions, or to both be blocked. In the configuration shown in FIG. 1, it would not be possible, for example, to block a signal component (λ1) in one direction but pass it (λ1) in an opposite direction. However, the present invention comprehends a fully bi-directional selector assembly as set out in more detail below. For example, through use of a circulator connected at either end of two devices 10 (such as shown in FIG. 7 and as described in detail below), signals can be selectively selected or deselected in either direction at will. Also, because of the symmetrical nature of the selector assembly 10 and the non-interfering nature of light, the number of selectors 38 needed will not exceed the number of first signal components or second signal components, whichever is larger.

It will be appreciated by those skilled in the art that the first collimator 20, the first demultiplexer 24 and the first focussor 26 operate as a first demultiplexer/multiplexer, operatively positioned between the end 12 and the selector 28, so that the first optical signal is demultiplexed into first signal components, each first signal component having a respective signal component beam path p incident to the selector. Similarly, the second collimator 30, the second demultiplexer 34 and the second focussor 36 act as a second multiplexer/demultiplexer, operatively positioned between the second end 16 and the selector 28, so that the second optical signal is demultiplexed by the second separator into second signal components, with each second signal component having a respective signal component beam path p.

It will also be appreciated that the first focussor 26, the first demultiplexer 24 and the first collimator 20, together act as a second signal component multiplexer, operatively positioned relative to the selector array 28, for multiplexing together the selected second signal components and directing them to the end 12. Similarly, the second focussor 36, the second demultiplexer 34 and the second collimator 30 act as a first signal component multiplexer, operatively positioned relative to the selector array 28, for combining the selected first signal components and directing them to directing the second end 16.

By having the first demultiplexer function simultaneously as a second signal components multiplexer, and the second demultiplexer function simultaneously as a first signal component multiplexer, the selector assembly 10 is rendered less complex, requires fewer parts, and is less expensive than it would be if additional parts were required to serve each of the separate functions.

In optical switching, it is beneficial for a switch to produce output signals that are of uniform power. Otherwise, at subsequent stages where amplification is provided, small signal power differences will also be amplified leading to large signal power differences which will create signal processing and handling problems. One method of achieving uniformity in output signals is to selectively attenuate signals emerging from the selector assembly 10, such that their power levels are at a predetermined level. Then, prior to final routing of the signal, amplification to the appropriate power level for the relevant optical system can be provided. Thus the present invention further comprehends selective attenuation as an additional feature of the invention. Selective attenuation can be achieved by scattering some amount of every signal that passes through the selector, so that no signal will emerge from the other side of the selector with more than a predetermined amount of signal strength.

Alternatively, attenuation can be achieved by providing a predetermined amount of polarization between the output signal and the input signal that will have the affect of attenuating the optical signal strength according to the degree of polarization occurring.

Figure 5:
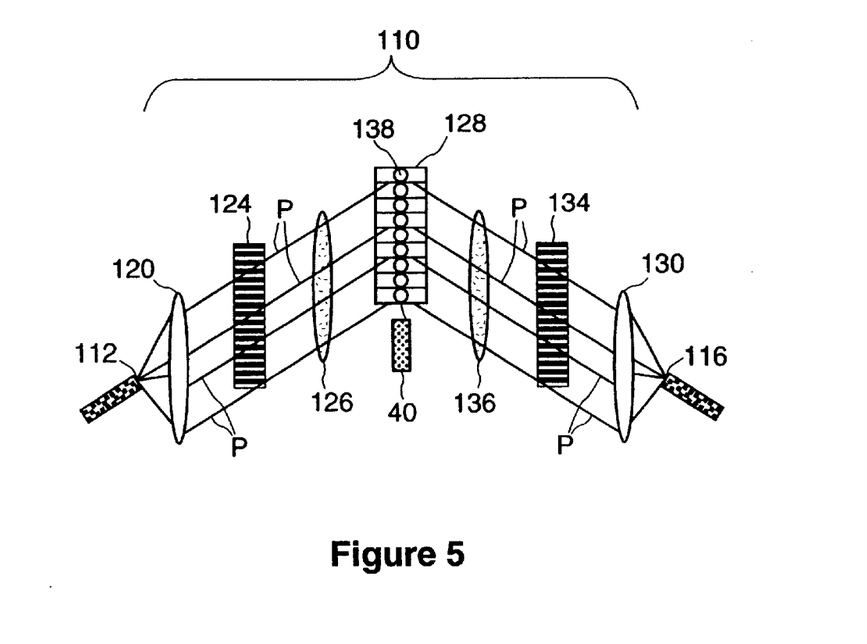
FIG. 5 is a schematic diagram of a first alternate embodiment of a selector assembly according to the present invention.

Referring now to FIG. 5, an alternative embodiment of the selector, designated by reference numeral 110, is shown. In the embodiment shown in FIG. 5, a reflective selector 128 having individual selectors 138 is used, rather than the transmissive selector array 28 shown in FIG. 1. As shown, a first collimator 120, a first demultiplexer 124 and a first focussor 126 are positioned essentially along side a second collimator 130, a second demultiplexer 134 and a second focussor 136. The first and second signal components, instead of passing through the selector once and continuing along the same path, pass through the selector, and are reflected back through the selector towards the appropriate first or second end 112 or 116.

The reflective selector 128 is different from the transmissive selector shown in FIGS. 2A and 2B. For example, the second electrode 46 would not need to be composed of a transparent material, but could be composed of a reflective material such as gold or platinum.

Figure 6:
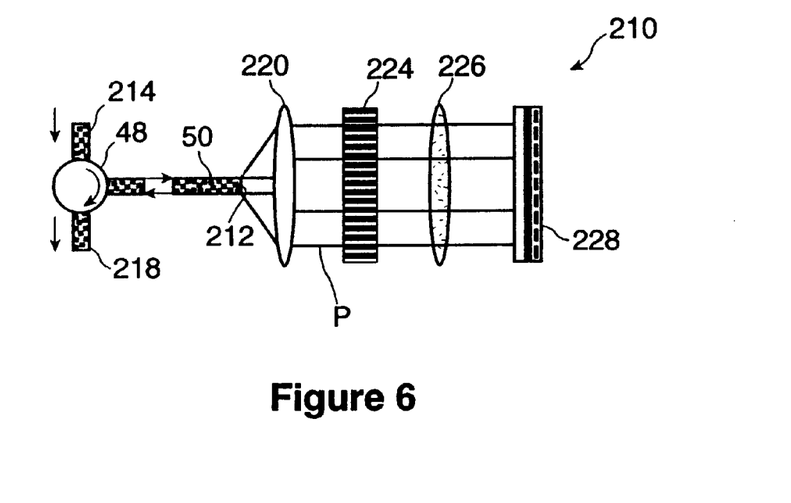
FIG. 6 is a schematic diagram of a second alternate embodiment of a selector assembly according to the present invention.

FIG. 6 shows an alternate embodiment of the selector according to the present invention designated by reference numeral 210. The embodiment shown in FIG. 6 is unidirectional, unlike the previous embodiments, but has the advantage of requiring fewer parts as described below.

The selector 210 includes a collimating lens 220, a demultiplexer 224 and a focussor 226. These components function identically to the first collimator 120, the first demultiplexer 124 and the first focussor 126 of the selector assembly 110 of FIG. 5. The optical signal being carried by the first optical signal carrier 214 is directed into the selector 210 by a circulator 48. Thus, the optical signal being carried by the optical signal carrier 214 is directed by the circulator along the intermediate signal carrier 50, and through the optical signal connector 212. The optical signal is then separated into its signal components and directed to the selectors 38 as described above.

The selector array 228 may be either reflective or retroreflective. A retroreflective surface is one in which the reflected light is reflected back along the same path, but in the opposite direction to, the incident light. Such a reflector will alleviate alignment problems that might otherwise occur and thus is preferred for this embodiment. When only a reflective selector element is used, it is critical that the collimating lens 220, the demultiplexer 224 and the focussor 226 be precise positioned relative to the selector element 228. Otherwise, the signal components that have been selected may not reflect back along exactly the same path and may not properly be directed back to the end 212. Since the focussor 226, demultiplexer 224 and the collimating lens 220 function to direct the selected signal components back to the optical signal carrier (in the same way as the corresponding components of the selector of FIG. 1) it is critical that the selected optical signal components follow the same path when leaving the selector element 228 as they did when entering the selector element 228. The use of a retroreflective selector array 228 alleviates this difficulty by ensuring that the selected signal components leaving the selector element 228 follow the same path that they follow into the selector element 228.

Once the selected signal components have been redirected to the intermediate signal carrier 50, they are directed to the circulator 48 which in turn directs the selected signal components to the second optical signal carrier 218.

FIG. 7 shows a bi-directional selector 400 that operates using two uni-directional selectors 500 and 502. The uni-directional selectors 500 and 502 may be of the type shown in FIG. 6. The present invention comprehends various forms of signal selectors. In some forms, the signal selector is unidirectional, that is, the signals can only enter the selector in one direction and exit the selector in one direction. An example is found in FIG. 6. In other selector embodiments signals can enter or exit by means of two connections, meaning that the selector is bi-directional. An example is found in FIG. 1. However, the limitation with FIG. 1 is that signals or signal components may pass in either direction or be blocked in either direction only. In some cases it will be preferred to permit signals or signal components to be blocked in one direction but to pass, simultaneously in the opposite direction. This is referred to as independent bidirectionality. FIG. 7 teaches one embodiment having independent bidirectionality which is comprehended by the present invention. As will be appreciated by those skilled in the art the choice of whether to include bidirectionality, and if so what type of bidirectionality will vary with need, cost of components and the like.

A first optical signal will enter the selector 400 through the optical signal carrier 64. Next, the signal encounters circulator 56, which is preferably in the form of a four-port circulator. The circulator 56 will direct the first optical signal to the uni-directional selector 500. The selected first signal components will then be directed back to the circulator 56, directed by the circulator 56 out into the second optical signal carrier 66.

A second optical signal may enter the selector 400 through the second optical signal carrier 66. The circulator 56 would direct the second optical signal through the unidirectional selector 502. The uni-directional selector 502 would direct the selected second signal components back to the circulator 56, which would direct the second signal components onto the first optical signal carrier 64.

Therefore, it will be appreciated by those skilled in the art that the benefits of a bi-directional selector can be obtained using circulators and uni-directional selectors, for example, as shown in FIG. 7. The disadvantage of such a configuration, however, as compared with the embodiment of FIG. 1, is that more components are required.

Figure 8:
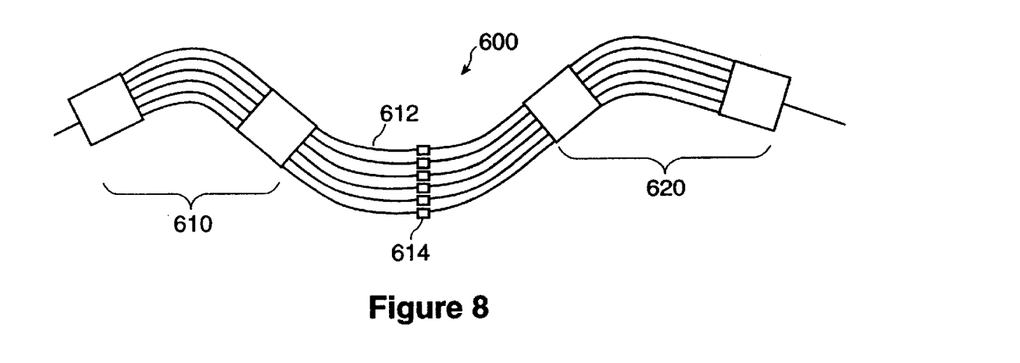
FIG. 8 is a schematic diagram of the selector array according to the present invention in combination with phased array wave guides.

Turning now to FIG. 8 a transmissive shutter array 600 is shown. In this embodiment demultiplexing is accomplished by AWG 610, which provides signal components along wave guides 612. The waveguides 612 are then passed into an array of electro-optic elements 614 that can have their optical properties varied according to an applied electrical signal. In this case the elements 614 are variable optical attenuators (VOAs). There needs to be a single attenuator for each signal component as shown. Then on the opposite side the signal may be multiplexed together for example by a second AWG 620. The advantage of this configuration is that the device is also bi-directional in the sense that a signal passing from either side will be demultiplexed, selected or deselected, and the multiplexed together again. Also, this is a small sized device.

Figure 9:
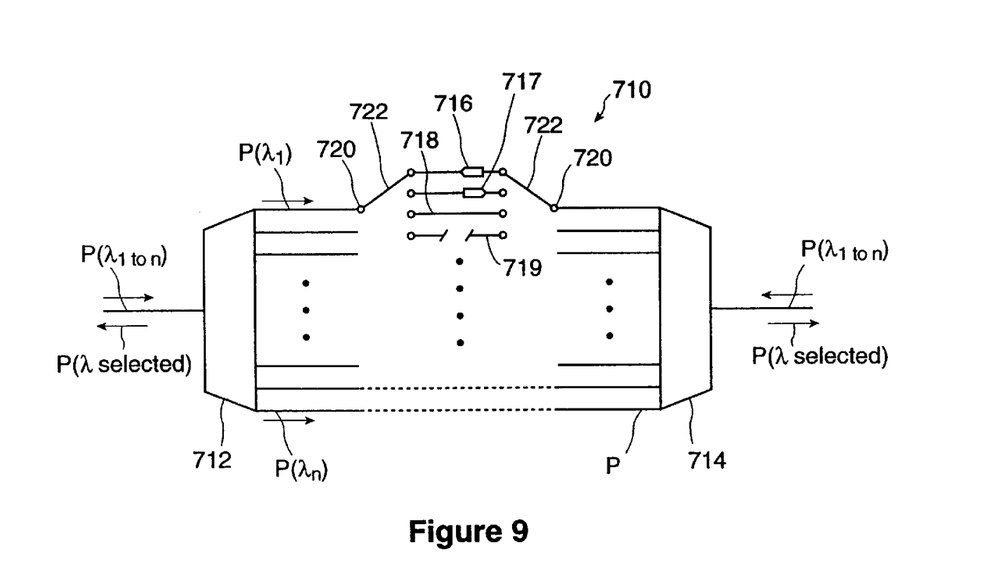
FIG. 9 is further embodiment of a bi-directional selector assembly that provides for individual signal manipulation and serial insertion.

Referring now to FIG. 9 a further embodiment of a bi-directional signal selector is shown at 710. In this embodiment the individual signal components arise by reason of demultiplexers 712 and 714. Each signal beam path p leads to a four-way switch. The four choices for each signal path, are west traffic only through an isolator 716, east traffic only through isolator 717, full east west traffic through line 718 and no traffic through disconnect 719. Thus in each direction, for each optical beam path p there is provided an optical terminal 720 and an optical jumper 722. The jumper 722 in essence establishes a four way optical switch. While only one four way switch is shown it will be understood that one four way switch is required for each of the individual signal component beam paths p. This configuration while requiring more components and thus being more expensive has the advantage of permitting individual signal insertion and parallel signal paths. Thus, the selector can be configured for east isolation, west isolation, clear east and west and blocked east and west.

It will be appreciated by those skilled in the art that various modifications and variations of the invention are comprehended by the broad scope of the attached claims. Some of these have been discussed above and others will be apparent to those skilled in the art. For example, while PLZT is the most preferred material because of the strong eletrooptic effect at moderate electrical fields with a rapid response rate, other materials can be substituted therefore. What is desired in the instant invention is to provide a signal separation, non-moving signal selection and then signal multiplexing for further transportation.

The embodiments of the invention in which an exclusive property or privilege is claimed are defined as follows:

1. A selector assembly to select and deselect signal components from optical signals, said selector assembly comprising:

an input optical connection for optically connecting an input optical signal carrier to said selector assembly;

an output optical connection for optically connecting said selector assembly to an output optical signal carrier;

a signal demultiplexer operatively positioned relative to said input optical connection so that optical signals passing into said selector assembly are demultiplexed by said demultiplexer into signal components, each signal component having a respective signal component beam path;

a signal selector located in each of said signal component beam paths, each of said signal selectors being electrically switchable between at least a selecting state and a deselecting state such that each of said signal components may be either selected or deselected;

a controller coupled to said selector element for creating the electric field for switching said selectors; and a signal multiplexer operatively positioned between said signal selector and said output optical connection for multiplexing said selected signal components together after selection.

2. The selector assembly as claimed in claim 1, wherein said selectors are comprised of a Ferro-electric electro-optic selector material.

3. The selector assembly as claimed in claim 2, wherein said selector material is formed from PLZT.

4. The selector assembly as claimed in claim 3 wherein said PLZT is electrically switchable by the application of an electric field applied coaxial with said signals and said selectors deselect said signal components by scattering the signal components.

5. The selector assembly as claimed in claim 3 wherein said PLZT is electrically switchable by the application of an electric field applied transverse to the path of the signal components and said selectors select and deselect signals by changing a polarity of the same.

6. The selector assembly as claimed in claim 2 wherein said electric field is applied by means of at least one transparent electrode placed in the signal component beam path.

7. The selector assembly as claimed in claim 6 wherein both of said electrodes are transparent electrodes formed from ITO.

8. The selector assembly as claimed in claim 6 wherein one of said electrodes is a transparent electrode and the other electrode is a reflective electrode.

9. The selector assembly as claimed in claim 8 wherein said reflective electrode is a retroreflective electrode.

10. The selector assembly as claimed in claim 1, wherein each of said signal components comprises a respective signal component wavelength band capable of carrying digitally encoded information.

11. The selector assembly as claimed in claim 1 wherein said selector is switchable with a response time of about 200 nanoseconds or less.

12. The selector assembly as claimed in claim 1 wherein said selector is switchable with a response time of about 50 nanoseconds or less.

13. The selector assembly as claimed in claim 1 wherein said selector is switchable up to about $10^{12}$ times.

14. The selector assembly as claimed in 1 wherein said demultiplexer comprises a diffraction grating.

15. The selector assembly as claimed in 6 further comprising a collimator, said collimator being operatively positioned relative to said optical connection so that said optical signal, passing from said optical connection through said collimator, is directed to said demultiplexer.

16. The selector assembly as claimed in claim 7 further including a focussor for directing said demutliplexed signal components onto said selector assembly.

17. The selector of claim 5 or claim 9, said separator further comprising one or more focussing lenses operatively positioned so as to direct each of said signal components along a respective signal component beam path and onto a respective shutter element.

18. The selector assembly as claimed in 1, wherein said demultiplexer comprises one of the group of a holographic diffraction grating, a replicated ruled diffraction grating, a prism, a blazed grating or an arrayed wave guide.

19. The selector assembly as claimed in claim 1 wherein said optical connections, signal demultiplexers and multiplexers and signal selectors are bidirectional to permit signals to be input and output from either of said connections.

20. A method of selecting signal components from optical signals, said method comprising the steps of:

(a) introducing a DWDM optical signal into a selector assembly;

(b) demultiplexing said optical signal into a plurality of signal components;

(c) directing each signal component along a signal component beam path incident to a electro optic selector element;

(d) electrically controlling said electroptic selector element to either select or deselect signal components, and (e) multiplexing said selected signal components together.

21. A signal selector assembly for selecting and deselecting optical signal components from optical signals, said signal selector assembly comprising:

a pair of signal demultiplexer/multiplexers, one located on either side of said signal selector assembly for demultiplexing signals passing into the signal selector assembly and for multiplexing selected signals passing out of the signal selector assembly; and a signal component selector located between the signal demultiplexer/multiplexers, said signal component selector permitting each optical signal component to pass through in an east only direction, in a west direction only, in both east and west directions simultaneously or in neither direction, wherein said signal selector assembly provides bi-directional signal component selection.

* * * * *

UNITED STATES PATENT AND TRADEMARK OFFICE
CERTIFICATE OF CORRECTION

PATENT NO. : 6,665,460 B2
DATED : December 2, 2003
INVENTOR(S) : Bailey et al.

It is certified that error appears in the above-identified patent and that said Letters Patent is hereby corrected as shown below:

Column 12,
Line 28, please change "housing" to -- mandrel --.

Signed and Sealed this

Seventeenth Day of August, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,665,460 B2
DATED         : December 16, 2003
INVENTOR(S)   : Stylianos Derventzis et al.

It is certified that error appears in the above-identified patent and that said Letters Patent is hereby corrected as shown below:

This certificate supersedes Certificate of Correction issued August 17, 2004. the number was erroneously mentioned and should be vacated since no Certificate of Correction was granted.

Signed and Sealed this

Twenty-eighth Day of September, 2004

JON W. DUDAS
*Director of the United States Patent and Trademark Office*